United States Patent von Pragenau et al.

[11] 3,952,980
[45] Apr. 27, 1976

[54] TRANSLATORY SHOCK ABSORBER FOR ATTITUDE SENSORS

[75] Inventors: George L. von Pragenau, Huntsville; Irvin T. Morgan, Jr., Madison; Clifton A. Kirby, Huntsville, all of Ala.

[73] Assignee: The United States of America as represented by the Administrator of the National Aeronautics and Space Administration, Washington, D.C.

[22] Filed: Oct. 29, 1974

[21] Appl. No.: 518,545

[52] U.S. Cl. ............................. 248/22; 188/1 B; 248/358 R
[51] Int. Cl.² ....................................... F16F 1/26
[58] Field of Search ............... 248/22, 21, 358 R; 267/160; 188/1 B

[56] References Cited
UNITED STATES PATENTS

| 2,756,016 | 7/1956 | Painter | 248/22 X |
| 3,063,670 | 11/1962 | Young | 267/160 UX |
| 3,154,273 | 10/1964 | Paulsen | 248/22 |
| 3,288,541 | 11/1966 | Tracy | 267/160 X |
| 3,743,268 | 7/1973 | Heiland | 267/160 |

FOREIGN PATENTS OR APPLICATIONS

| 1,362,687 | 4/1964 | France | 248/358 R |

Primary Examiner—J. Franklin Foss
Attorney, Agent, or Firm—Wayland H. Riggins; L. D. Wofford, Jr.; John R. Manning

[57] ABSTRACT

A translatory shock absorber is provided for mounting an attitude sensor thereon for isolating a sensor from translatory vibrations. The translatory shock absorber includes a hollow block structure formed as one piece to form a parallelogram. The absorber block structure includes a movable top plate for supporting the attitude sensor and a fixed base plate with opposed side plates interposed therebetween. At the junctions of the side plates, and the base and top plates, there are provided machined-out grooves which act as flexible hinges for attenuating translatory vibrations. A damping material is supported on a pedestal which is carried on the base plate between the side plates thereof. The top of the damping material rests against the bottom surface of the top plate for eliminating the resonant peaks of vibration.

1 Claim, 2 Drawing Figures

TRANSLATORY SHOCK ABSORBER FOR ATTITUDE SENSORS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to a translatory shock absorber for mounting attitude sensors and more particularly for mounting instruments which are used to measure the rotation of space vehicles and the like. The shock absorber is made as a hollow block with rigid sides which are joined to the top and base portion by flexing grooves which are machined at the junctions and act as flexible hinges to reduce the translatory vibration without introducing any rotational affects through the shock absorber.

The instruments used for attitude control in space vehicles must survive a vibration environment of approximately 50 m/sec$^2$ RMS (root mean square averaged over 0–1000Hz) acceleration levels which are generated by the combustion process of the engines and turbulent airflows about the vehicle. Rugged instruments were therefore developed and have been flown successfully in our space vehicles even without employing shock absorbing mounts which could have reduced vibration levels for the attitude sensors. Hard mounts were preferred, because common shock mounts add rotation effects which convert translatory vibrations to rotations and also introduce dynamic response which could jeopardize the vehicle's stability.

Devices have been developed for mounting and supporting precision instruments as shown, for example, in U.S. Pat. No. 3,290,949 for providing limited rotational movement between the supported device and the mount or supporting member to compensate for vibrational loading and environmental changes. However, these devices do not effectively isolate the instrument from translatory vibrations without introducing rotational affects through the mounting device.

SUMMARY OF THE INVENTION

A shock absorber device is disclosed for attenuating translatory vibrations comprising a base plate fixed upon the platform of a space vehicle having two integral side plates, spaced longitudinally, which support a top plate. An attitude sensor is mounted upon the top plate. Flexible joints are provided in the side plates by machining lateral grooves at the junctions of the side plates and the base and top plates so that the top plate can translate parallel to the fixed base plate for effectively isolating the sensor from translatory vibrations. Damping means are interposed between the base and top plates for limiting the resonant movement of the top plate relative to the base plate.

Accordingly, it is an important object of the present invention to provide an effective translatory shock absorber which attenuates translatory vibrations for attitude sensing instruments used in space vehicles without introducing rotational affects through the shock absorber.

Another important object of the present invention is to provide a translatory shock absorber for mounting attitude sensing instruments which can be beneficially used in re-usable space vehicles (e.g., space shuttle vehicles) to increase the instrument life above that required for expendable booster vehicles.

A further object of the present invention is to construct a translatory shock absorber which minimizes friction, provides for viscous damping applied directly to the translating absorber case, and has one-piece machinability.

The construction designed to carry out the invention will be hereinafter described, together with other features thereof.

BRIEF DESCRIPTION OF THE DRAWING

The invention will be more readily understood from a reading of the following specification and by reference to the accompanying drawing forming a part thereof, wherein an example of the invention is shown and wherein.

DESCRIPTION OF THE PREFERRED EMBODIMENT

Figure 1:
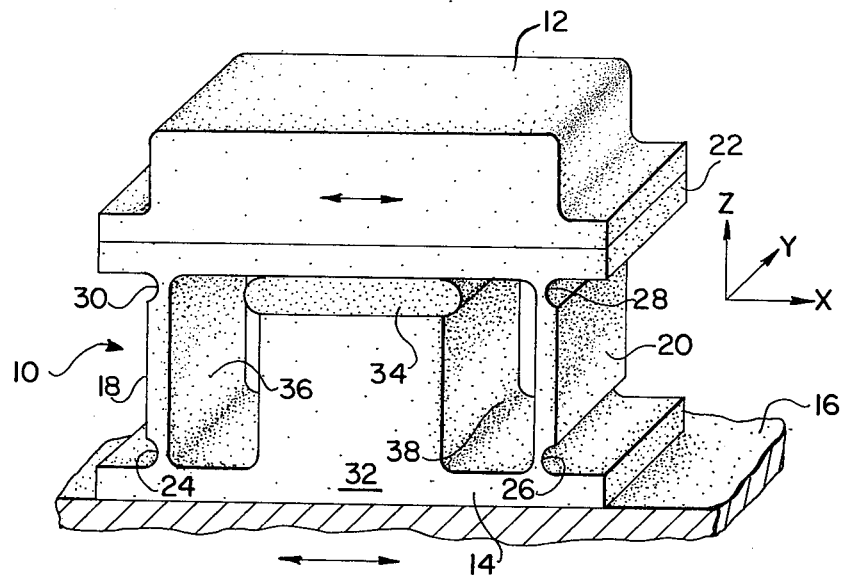
FIG. 1 is a side perspective view illustrating a shock absorbing mounting device constructed in accordance with the present invention which attenuates translatory vibrations in the X-direction.

Referring in more detail to FIG. 1 of the drawing, a translatory shock absorber is shown, designated broadly as 10, for mounting a precision attitude sensor 12. The shock absorber includes a base plate 14 fixed to a platform 16 in a space vehicle. Integral with the base plate 14 are two longitudinally spaced, rigid side plates 18 and 20 which extend vertically to support a movable top plate 22 and are integral therewith. Groove 24 extends laterally along the junction of side plate 18 and base plate 14 to define a flexible joint. Flexibility is essentially concentrated along the flexing groove 24 which acts like a hinge, but without causing friction. Flexibility in the groove 24 could be obtained by machining only from the outside of plate 18, but machining from the inside is not excluded. A similar groove 26 is formed at the junction of side plate 20 and base plate 14, and similar grooves 28 and 30 are formed at the junction of top plate 22 and side plates 20 and 18, respectively.

Base plate 14, side plates 18 and 20, and top plate 22, together form a hollow parallelogram block structure. A pedestal block 32 is integral with base plate 14 and extends upwardly from the base plate 14 and terminates below the top plate 22. Between the top of pedestal block 32 and the bottom of top plate 22 a gap is formed for receiving an element of viscous damping material 34. Two hollow spaces 36 and 38 are formed by the outside walls of pedestal block 32 and the side plates 18 and 20, respectively.

The hollow block structure including pedestal block 32 is preferably machined out or molded of a one piece stock of material. The flexing grooves 24, 26, 28 and 30 are either molded or later machined in the one piece block or may be machined out of a different material inserted at the junctions of the side plates 18 and 20 with base and top plates 14 and 22, respectively, and made integral therewith. In either case, intrinsic stiffness of the material in the grooves is important in preventing warping of the parallelogram structure and for maintaining the top plate 22 parallel to the fixed base plate 14. The material used will also be a function of the magnitude of the vibrational loads involved, of the input of other forces upon the shock absorber unit, and of the vibrational sensitivity of the sensor 12 as will be explained later. One material which has been found suitable in the application to space vehicles motion sensors is general purpose molded nylon.

The top plate 22 is supported by the rigid side grooves (24, 26, 28 and 30). Damper element 34 is preferably not for supporting top plate 22, but primarily functions to eliminate the resonant peaks of vibration. The damper element 34 may be made from neoprene or any other suitable viscous damping material, and can be a viscoelastic block or a bag containing viscous fluid working against internal baffles.

The use of mechanical hinges, instead of the flexible joints provided by grooves 24, 26, 28, and 30, would involve stiction or static friction where hinges would stick and then break away when the translatory motion was large enough. Thus, the mechanical hinges would not attenuate or reduce translatory vibrations at all levels but would break away at some point or level of vibration. The flexing grooves of the present invention attenuate the translatory vibrations at all levels.

The translatory shock absorber shown in FIG. 1 attenuates translatory vibrations in the direction of the X-axis only. The movable top plate 22 can translate only in the X-direction as the rigid side plates 18 and 20 flex at the grooves to attenuate the vibrations. Damping element 34 is always in contact with the top of pedestal block 32 and the bottom of top plate 22. As top plate 22 translates in the X-direction, the relative X-distance between top plate 22 and base plate 14 is changed and damping element 34 is distorted slightly.

In principle, the attenuation (c) of the translatory vibrations in the X-direction by the shock absorber 10, shown in FIG. 1, is given by:

$$c = b \; \frac{1 + (S/\Omega)\, 2\zeta}{1 + (S/\Omega)\, 2\zeta + (S/\Omega)^2} \quad (1)$$

where,

C = the attenuation in x-direction of top plate 22
b = x-excitation of base plate 14
$\Omega = K/M$
$f = \Omega/2\pi$
$S = j\omega$
and,
$\zeta$ is a damping factor determined by damping element 34. The translatory shock absorber resonates near the frequency $f$ beyond which the attenuation becomes effective according to R in (2), $$\text{for } f > f_o, \; c = -jbR, \; R = 2\zeta(f_o/f). \quad (2)$$

Damper 34 produces $\zeta$ which should be high enough (e.g. $\zeta = 0.4$) to avoid a high resonance peak, but sufficiently low for good attenuation (see R in 2). It is not suggested to use a critical damping ($\zeta = 1$). Equations (1) and (2) are basic to any shock absorber and are only used here for functional explanations. The resonance frequency $f_o$ is given by the stiffnesses of the flexing grooves (24, 26, 28, and 30) and damper 34 and the movable masses of top plate 22 and sensor 12 combined. The sum of stiffnesses is K and the sum of the masses is $M$. Preferable values of $f_o$ are 10–20 Hz.

The resonance frequency ($f_o$) must be compatible with the sensitivity of the attitude sensor 12. For example, if the sensor is sensitive at a frequency of 200 Hz, then the resonance frequency ($f_o$) of the shock absorber must be below 200 Hz.

Figure 2:
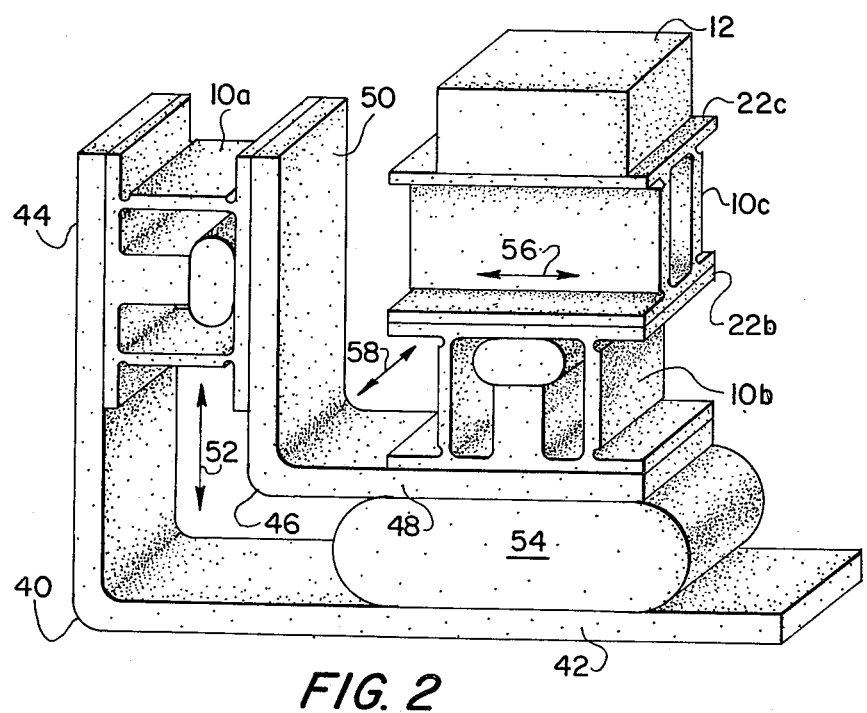
FIG. 2 is a perspective view illustrating a three-dimensional translatory shock absorber constructed in accordance with the present invention.

FIG. 2 illustrates a combination of three translatory shock absorbers, in accordance with the present invention, in a perpendicular arrangement of the three translatory axes to provide a three-dimensional translatory shock absorber. The three-dimensions are defined by a conventional cartesian co-ordinate system. The three-dimensional shock absorber includes an L-shaped base member having a horizontal planar leg 42 and a vertical planar leg 44. Spaced above the L-shaped base member 40 in parallel alignment is a second L-shaped member 46 having a horizontal planar leg 48 and a vertical planar leg 50. Interposed between vertical planar legs 44 and 50 is a translatory shock absorber device 10a for attenuating translatory vibrations in the direction of axis 52 (Z-axis). Interposed between the horizontal planar legs 42 and 48 is an inflated air bag 54 to balance acceleration forces along axis 52 (z-axis). Mounted on top of horizontal planar leg 48 is a second translatory shock absorber 10b for attenuating translatory vibrations in the direction of axis 56 (x-direction). Mounted on the top plate 22b of the shock absorber 10b is a third translatory shock absorber 10c for attenuating translatory vibrations in the direction of axis 58 (Y-axis). Mounted on the top plate 22c of shock absorber 10c is the precision attitude sensor 12. Alternate embodiments in accordance with the present invention would contemplate the combination of any number of translatory shock absorbers such as just two.

For purposes of illustratiing the size of a translatory shock absorber constructed in accordance with one particular application of the invention and not for limiting the size thereof the following dimensions are given, (dimensions in inches in order of the length, width, and thickness or height):

| | | |
|---|---|---|
| (1) | Base plate 14 | 3.0 × 3.0 × .1875 |
| (2) | Top plate 22 | 3.0 × 3.0 × .1875 |
| (3) | Side plates 18 and 20 | 3.0 × .292 × .500 |
| (4) | Pedestal block 32 | 3.0 × 1.0 × .3125 |
| (5) | Depth of machined-out groove | .125 |
| (6) | Gap between pedestal block 32 and bottom of top plate 22 | .1875 |
| (7) | Offset of side plates from end of base and top plates | .250 |

Thus, it can be seen that a compact, rather simple and inexpensive translatory shock absorber device is provided to protect precision attitude sensors and protect their functional life. The shock absorber device attenuates translatory vibrations in the direction of one axis of motion. In the case where the attitude sensor is sensing rotation about one axis (e,g., X-axis) in a space vehicle, the shock absorber device would isolate the rotation sensor from translatory vibrations along the axis but would permit the rotational motion about the axis to be transmitted to the sensor in a 1:1 ratio. Of course, in the three-dimensional shock absorber of FIG. 2, the sensor 12 would be isolated from translatory vibrations along all three axes while permitting the rotational motion about the three axes to be transmitted to the sensor in a 1:1 ratio.

While a preferred embodiment of the invention has been described using specific terms, such description is for illustrative purposes only, and it is to be understood that changes and variations may be made without departing from the spirit or scope of the following claims.

What is claimed is:

1. A three-dimensional translatory shock absorber device for mounting a precision instrument or the like for reducing translatory vibrations or motion along each of the three axes defined by a cartesian-coordinate system comprising;
   a first L-shaped base member having a horizontal planar leg normal to the Z-axis direction and a shorter vertical planar leg normal to the X-axis direction;
   a second L-shaped member spaced above said first base member and having a horizontal planar leg and a shorter vertical planar leg is parallel alignment with said first L-shaped base member;
   a first translatory shock absorber device interposed between said vertical planar legs of said first L-shaped base member and said second L-shaped member for reducing translatory vibrations in the direction of the Z-axis;
   a cushioning spacer interposed between said horizontal planar legs of said first L-shaped base member and said second L-shaped member;
   a second translatory shock absorber device mounted upon the top surface of said horizontal planar leg of said second L-shaped member for reducing translatory vibrations in the direction of the X-axis;
   a third translatory shock absorber device mounted on the top plate of said second translatory shock absorber device for reducing translatory vibrations in the direction of the Y-axis;
   each of said translatory shock absorber devices comprising a first pair of spaced parallel plates and a second pair of spaced parallel plates interposed between said first pair of plates and being integral therewith;
   laterally extending grooves provided in said second pair of plates at the junctions between said first and second pair of plates;
   damping means interposed between said first pair of plates for limiting movement of said first pair of plates relative to each other;
   said precision instrument mounted on the top plate of said third translatory shock absorber device;
   whereby said grooves provide a flexible joint between said first and second pair of plates and whereby said combination of translatory shock absorber devices effectively isolates said precision instrument from translatory vibration along each axis of motion without introducing rotational effects through said shock absorber devices.

* * * * *